(12) United States Patent
Kong et al.

(10) Patent No.: US 11,249,362 B2
(45) Date of Patent: Feb. 15, 2022

(54) LIQUID CRYSTAL DISPLAY APPARATUS

(71) Applicant: LG Display Co., Ltd., Seoul (KR)

(72) Inventors: Min-Suk Kong, Chilgok-gun (KR); Moon-Soo Kang, Daegu (KR); Jong-Chun Lim, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/127,263

(22) Filed: Dec. 18, 2020

(65) Prior Publication Data

US 2021/0200043 A1 Jul. 1, 2021

(30) Foreign Application Priority Data

Dec. 30, 2019 (KR) .................. 10-2019-0178471

(51) Int. Cl.
*G02F 1/1362* (2006.01)
*G02F 1/1368* (2006.01)
*G02F 1/1339* (2006.01)
*G02F 1/1337* (2006.01)
*G02F 1/1343* (2006.01)

(52) U.S. Cl.
CPC ...... *G02F 1/136286* (2013.01); *G02F 1/1337* (2013.01); *G02F 1/1339* (2013.01); *G02F 1/1368* (2013.01); *G02F 1/134372* (2021.01); *G02F 1/136222* (2021.01)

(58) Field of Classification Search
None
See application file for complete search history.

(56) References Cited

U.S. PATENT DOCUMENTS

| 2015/0160520 | A1* | 6/2015 | Matsushima | ..... G02F 1/134309 349/33 |
| 2015/0234243 | A1 | 8/2015 | Oono et al. | |
| 2017/0285415 | A1* | 10/2017 | Kabe | ................ G02F 1/134309 |
| 2020/0110337 | A1* | 4/2020 | Tanigaki | ................ G03F 7/038 |

FOREIGN PATENT DOCUMENTS

| JP | 2015-155953 A | 8/2015 |
| KR | 10-2018-0028821 A | 3/2018 |
| KR | 10-2019-0057721 A | 5/2019 |

* cited by examiner

*Primary Examiner* — James A Dudek
(74) *Attorney, Agent, or Firm* — Birch, Stewart, Kolasch & Birch, LLP

(57) ABSTRACT

Disclosed is a liquid crystal display apparatus in which a low-resistance alignment film and a low-resistance liquid crystal layer are provided only in red (R) and green (G) pixel areas so as to prevent bright pixel defects caused by occurrence of data coupling (DC). The liquid crystal display apparatus includes gate lines and data lines arranged on a first substrate so as to define red (R), green (G) and blue (B) pixel areas, thin film transistors provided at intersections between the gate lines and the data lines, a first alignment film provided on the first substrate, a second substrate arranged with a uniform gap with the first substrate, red, green and blue color filter layers provided on the second substrate, and a second alignment film provided on the second substrate, wherein the first alignment film provided on the red and green color filter layers is a low-resistance alignment film.

12 Claims, 13 Drawing Sheets

LIQUID CRYSTAL DISPLAY APPARATUS

CROSS-REFERENCE TO RELATED APPLICATIONS

This application claims the priority benefit of Korean Patent Application No. 10-2019-0178471, filed in the Republic of Korea on Dec. 30, 2019, the entire contents of which are hereby expressly incorporated by reference as if fully set forth herein into the present application.

BACKGROUND OF THE INVENTION

Field of the Invention

The present invention relates to a liquid crystal display apparatus, and more particularly, to a liquid crystal display apparatus in which an alignment film or a liquid crystal layer in red (R) and green (G) pixel areas is designed to realize resistance different from resistance in other pixel areas in a flip structure so as to prevent bright pixel defects caused by occurrence of data coupling (DC).

Discussion of the Related Art

With the advancement of the information-oriented society, demand for various kinds of display apparatuses for displaying images has increased. Accordingly, various flat display apparatuses, such as liquid crystal displays, field emission displays, plasma display panels and light emitting displays, are used at present.

Among these flat display apparatuses, liquid crystal display apparatuses are capable of being driven at low power and of realizing excellent image quality, and thus are widely used now.

Most light emitting display apparatuses have a structure in which a thin film transistor substrate including thin film transistors arranged thereon in a matrix and a color filter substrate including color filters arranged thereon are bonded and then a liquid crystal layer is interposed between the thin film transistor substrate and the color filter substrate. The thin film transistor substrate and the color filter substrate must be bonded such that a pixel area formed on the thin film transistor substrate and a pixel area formed on the color filter substrate completely overlap each other. In order to reduce the occurrence of errors during such an alignment process, a color filter layer can be formed on the thin film transistor substrate.

In a liquid crystal display apparatus according to a related art, red (E), green (G) and blue (B) pixel areas are designed such that widths of pixel electrodes and distances between the pixel electrodes are equal and the same alignment film and liquid crystal layer are provided in these pixel areas. Thus, when the temperature is raised, the resistance of the alignment film is greatly increased, and bright pixel defects, which are a high-temperature reliability failures, can be caused by occurrence of data coupling (DC).

Such data coupling (DC) is an important factor that can cause an afterimage together with electrical characteristics of the alignment film. Since data coupling (DC) changes a pretilt angle, which is an optical parameter of liquid crystal molecules in a liquid crystal cell, and thus changes the orientation of the molecules, the liquid crystal molecules cannot sensitively respond to changes in signal voltage applied from the outside. Thus, if the same image is displayed for a long time, even when a display screen is changed, the initial screen can leave a trace due to accumulated charges.

SUMMARY OF THE INVENTION

Accordingly, the present invention is directed to a liquid crystal display apparatus that substantially obviates one or more problems due to limitations and disadvantages of the related art.

An object of the present invention is to provide a liquid crystal display apparatus in which a low-resistance alignment film and a low-resistance liquid crystal layer are formed in red (R) and green (G) pixel areas, but not in blue (B) pixel areas so as to prevent bright pixel defects caused by occurrence of data coupling (DC).

Additional advantages, objects, and features of the invention will be set forth in part in the description which follows and in part will become apparent to those having ordinary skill in the art upon examination of the following or can be learned from practice of the invention. The objectives and other advantages of the invention can be realized and attained by the structure particularly pointed out in the written description and claims hereof as well as the appended drawings.

To achieve these objects and other advantages and in accordance with the purpose of the invention, as embodied and broadly described herein, a liquid crystal display apparatus includes a plurality of gate lines arranged in one direction on an upper surface of a first substrate, a plurality of data lines arranged to intersect the gate lines so as to define red (R), green (G) and blue (B) pixel areas, common lines formed alternately with the data lines, thin film transistors formed at intersections between the gate lines and the data lines, pixel electrodes connected to the thin film transistors and common electrodes connected to the common lines to form a fringe field with the pixel electrodes, a first alignment film formed on an entire lower surface of the first substrate, a second substrate arranged at a uniform distance from the first substrate, red, green and blue color filter layers formed on the second substrate so as to correspond to the red (R), green (G) and blue (B) pixel areas, respectively, a second alignment film formed on the second substrate opposite to the first alignment film, and a liquid crystal layer formed between the first substrate and the second substrate, wherein the first alignment film formed on the red and green color filter layers is a low-resistance alignment film.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EMBODIMENTS

Reference will now be made in detail to the exemplary embodiments of the present invention, examples of which are illustrated in the accompanying drawings. However, the present invention can be embodied in many alternative forms and should not be construed as being limited to the embodiments set forth herein, the embodiments of the present invention are provided only to completely disclose the invention and to completely inform those skilled in the art of the scope of the invention. In the drawings, the sizes, thicknesses, etc. of elements can be exaggerated for convenience of depiction. In the following description of the embodiments and the drawings, the same or similar elements are denoted by the same reference numerals even when they are depicted in different drawings.

Advantages and features of the present invention and methods for achieving the same will become apparent from the description of the embodiments herein below with reference to the accompanying drawings. However, the present invention can be embodied in many alternative forms and should not be construed as being limited to the embodiments set forth herein, the embodiments of the present invention are provided only to completely disclose the invention and to completely inform those skilled in the art of the scope of the invention, and it is intended that the present invention is defined by the appended claims. In the drawings, the sizes, including relative sizes, of layers and regions can be exaggerated for clarity of depiction.

In the following description of the embodiments, it will be understood that, when positional relationships are expressed, for example, when an element is "on", "above", "under" or "beside" another element, the two elements can directly contact each other, or one or more other elements can be interposed between the two elements. However, it will be understood that, when an element is "directly on" or "just on" another element, no element or layer is interposed between the two elements.

In the following description of the embodiments, spatially relative terms, such as such as "below", "beneath", "lower", "above", "upper" and the like, can be used herein for ease of description to describe the relationship between one device or element and another device(s) or element(s) as illustrated in the figures. Spatially relative terms can be intended to encompass different orientations of the device in use or operation, in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below.

The terminology used herein is for the purpose of describing particular exemplary embodiments only and is not intended to be limiting. In the following description of the embodiment, singular expressions can be intended to include plural expressions unless the context clearly indicates otherwise. In the following description of the embodiments, the terms "comprises," "comprising," "including," and "having," are specify the presence of stated components, steps, operations and/or elements, and do not exclude the presence or addition of one or more other components, steps, operations and/or elements.

Figure 1:
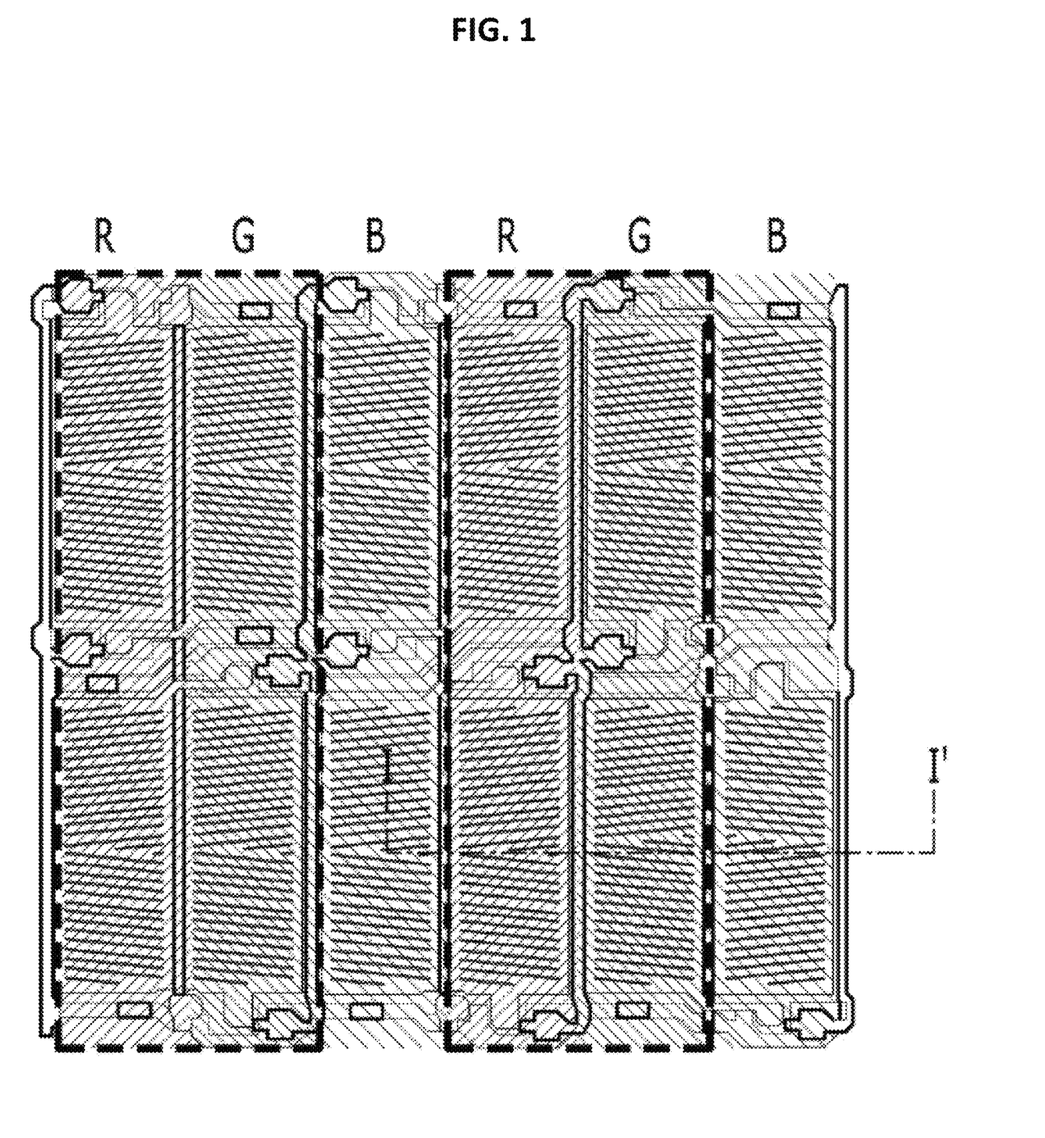
FIG. 1 and FIG. 2 are plan views illustrating liquid crystal display apparatuses having a flip structure according to an embodiment of the present invention, in which a low-resistance alignment film and a low-resistance liquid crystal layer are applied only to red (R) and green (G) pixel areas.
Figure 2:
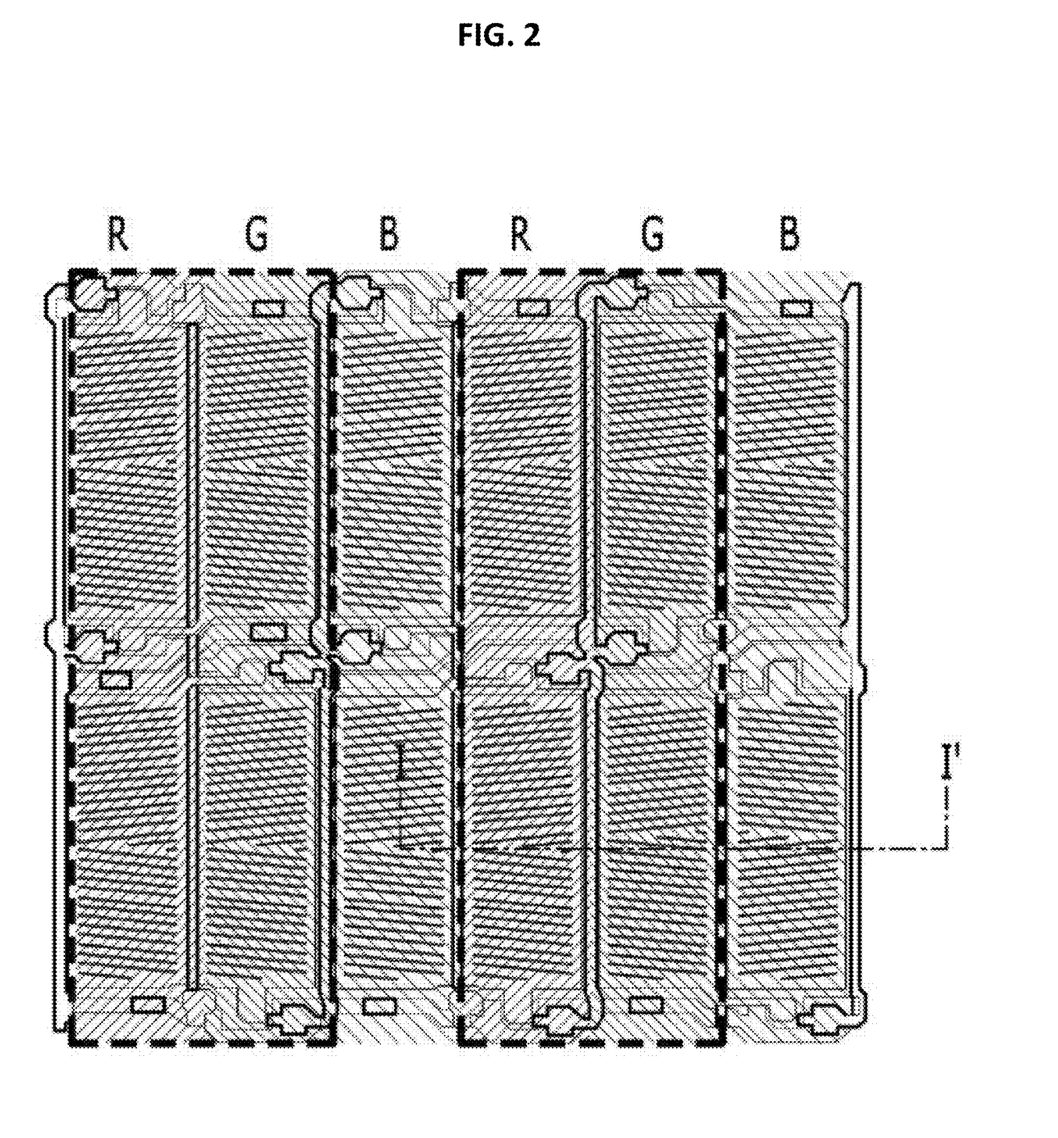
Figure 3:
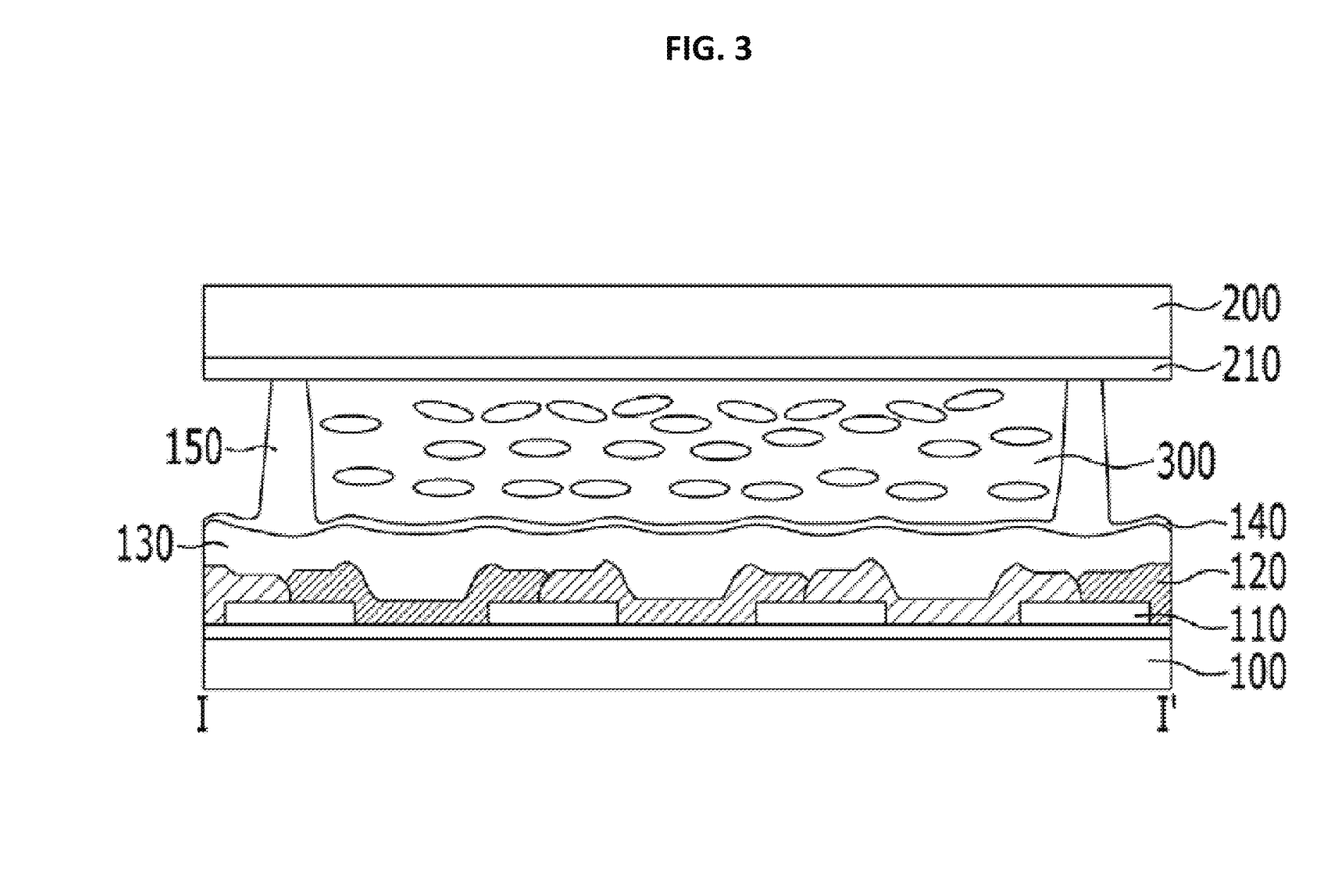
FIG. 3 is a cross-sectional view schematically illustrating the liquid crystal display apparatus, taken along line I-I' of FIG. 1 or 2.

FIGS. 1 and 2 are plan views illustrating liquid crystal display apparatuses having a flip structure according to an embodiment of the present invention, in which a low-resistance alignment film and a low-resistance liquid crystal layer are applied only to red (R) and green (G) pixel areas. FIG. 3 is a cross-sectional view along line I-I' of FIG. 1 or 2, which schematically illustrates the liquid crystal display apparatus according an example of to the present invention. All the components of the liquid crystal display apparatus according to all embodiments of the present invention are operatively coupled and configured.

Here, FIGS. 1 and 2 schematically illustrate a portion of a fringe field switching (FFS)-type liquid crystal panel in which a fringe field formed between a pixel electrode and a common electrode passes through a slit and thus drives liquid crystal molecules located on the common electrode in a pixel area, and thereby, an image is realized. However, the present invention is not limited thereto, and can be applied to an in-plane switching (IPS)-type liquid crystal display apparatus using an in-plane field in addition to the FFS-type liquid crystal display apparatus.

The liquid crystal display apparatus according to one or more embodiments of the present invention includes, as shown in FIGS. 1 to 3, a plurality of gate lines Gate and a plurality of data lines Data intersecting each other to define pixel areas, red, green and blue color filter layers 120 formed on a lower substrate 100 in the respective pixel areas defined by the gate lines Gate and the data lines Data so as to be spaced apart from each other by a uniform distance, a black matrix layer 110 formed on the lower substrate 100 between the red, green and blue color filter layers 120, an overcoat film 130 formed on the entire upper surface of the lower substrate 100 including the respective color filter layers 120, a first alignment film 140 formed on the overcoat film 130, an upper substrate 200 arranged at a uniform distance from the lower substrate 100 and including a second alignment film 210 formed thereon opposite to the first alignment film 140, and a liquid crystal layer 300 formed between the upper substrate 200 and the lower substrate 100, and the first and second alignment films 140 and 210 formed on the red and green color filter layers 120 are low-resistance alignment films.

Here, each of the first and second alignment films 140 and 210 is divided into a first area and a second area, the first area are the red (R) and green (G) pixel areas, and the second area is the blue (B) pixel area.

In both the first and second areas, the alignment films 140 and 210 include a polyimide moiety including a plurality of imide groups and a polyamic acid moiety including a plurality of amic acid groups.

Here, the alignment films 140 and 210 in the first area are low-resistance alignment films, unlike the alignment films 140 and 210 in the second area.

For example, the first area includes an alignment film formed of at least one type of polyamic acids or polyimides, and an alignment film formed of the other type, differing from the former alignment film.

The liquid crystal display apparatus according to one or more embodiments of the present invention further includes a column spacer 150 configured to maintain a uniform gap between the lower substrate 100 and the upper substrate 200, and the column spacer 150 is a black column spacer.

Each of the lower substrate 100 and the upper substrate 200 can be a transparent substrate which can transmit light, for example, a glass substrate or a plastic substrate. For example, the plastic substrate can be formed of a cellulose resin, such as triacetyl cellulose (TAC) or diacetyl cellulose (DAC), cyclic olefin polymer (COP), such as norbornene derivatives, cyclic olefin copolymer (COC), an acryl resin, such as polymethyl methacrylate (PMMA), polycarbonate (PC), a polyolefin, such as polyethylene (PE) or polypropylene (PP), polyvinyl alcohol (PVA), poly ether sulfone (PES), polyetheretherketone (PEEK), polyetherimide (PEI), polyethylene naphthalate (PEN), polyester, such as polyethylene terephthalate (PET), polyimide (PI), polysulfone (PSF), or fluororesin.

The gate lines Gate and the data lines Data are formed of at least one selected from the group of conductive metals consisting of aluminum (Al), tungsten (W), copper (Cu), molybdenum (Mo), chrome (Cr), titanium (Ti), molybdenum-tungsten (MoW), molybdenum-titanium (MoTi) and copper/molybdenum-titanium (Cu/MoTi).

Figure 4:
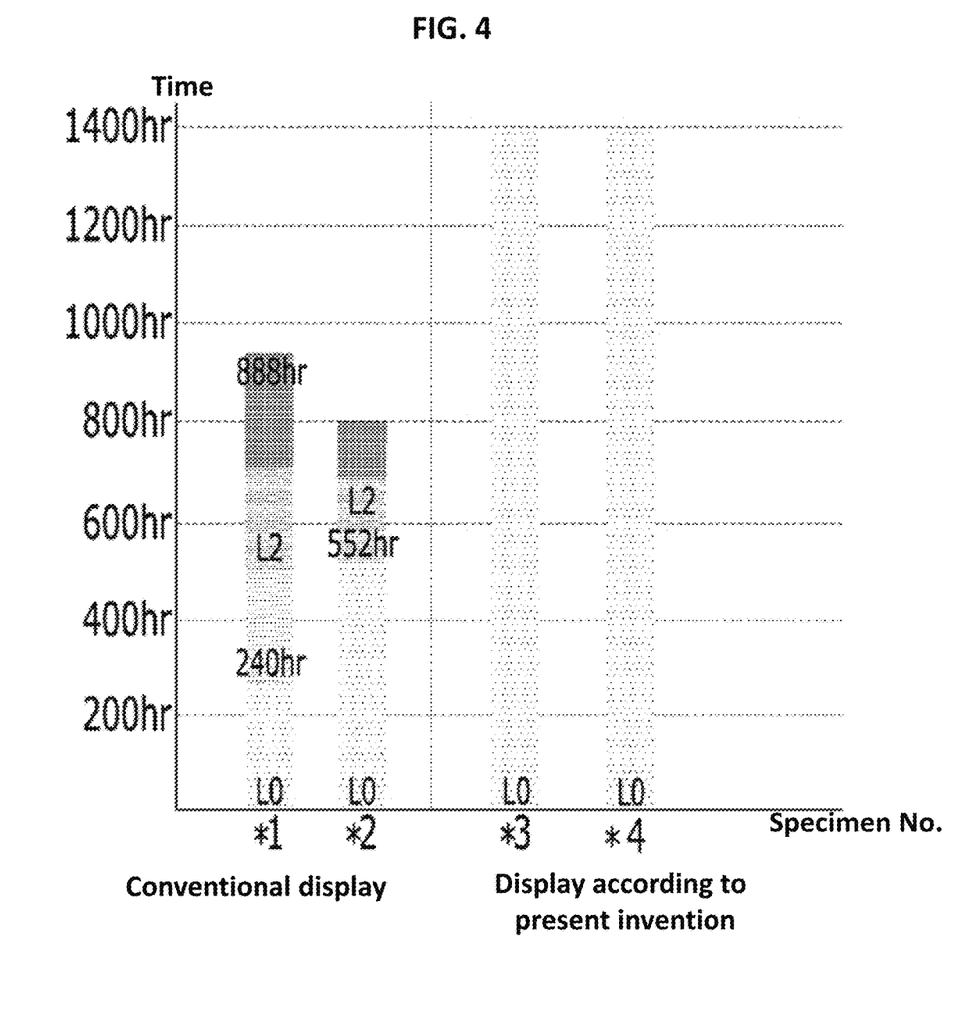
FIG. 4 is a graph comparatively showing results of high-temperature reliability evaluation of respective specimens of the liquid crystal display apparatus according to an example of the present invention, in which the low-resistance alignment film is applied only to the red (R) and green (G) pixel areas, and respective specimens of a conventional liquid crystal display apparatus over time.

FIG. 4 is a graph comparatively showing results of high-temperature reliability evaluation of respective specimens of the liquid crystal display apparatus according to an example of the present invention, in which the low-resistance alignment film is applied only to the red (R) and green (G) pixel areas, and respective specimens of a conventional liquid crystal display apparatus over time.

Referring to FIG. 4, as the results of high-temperature reliability evaluation, it can be confirmed that a bright pixel defect occurred in the conventional liquid crystal display apparatus but that no bright pixel defect occurred in the liquid crystal display apparatus in which the low-resistance alignment film is applied only to the red (R) and green (G) pixel areas.

For example, when the high-temperature reliability of the conventional liquid crystal display apparatus in which the same alignment film is applied to the red (R), green (G) and blue (B) pixel areas was evaluated, a bright pixel defect occurred in specimen #1 after 240 hrs, and a bright pixel defect occurred in specimen #2 after 552 hrs. In contrast, when the high-temperature reliability of the liquid crystal display apparatus according to the present invention, in which the low-resistance alignment film is applied only to the red (R) and green (G) pixel areas was evaluated, no bright pixel defect occurred in specimens #3 and #4 even after 1,400 hrs had passed.

Figure 5:
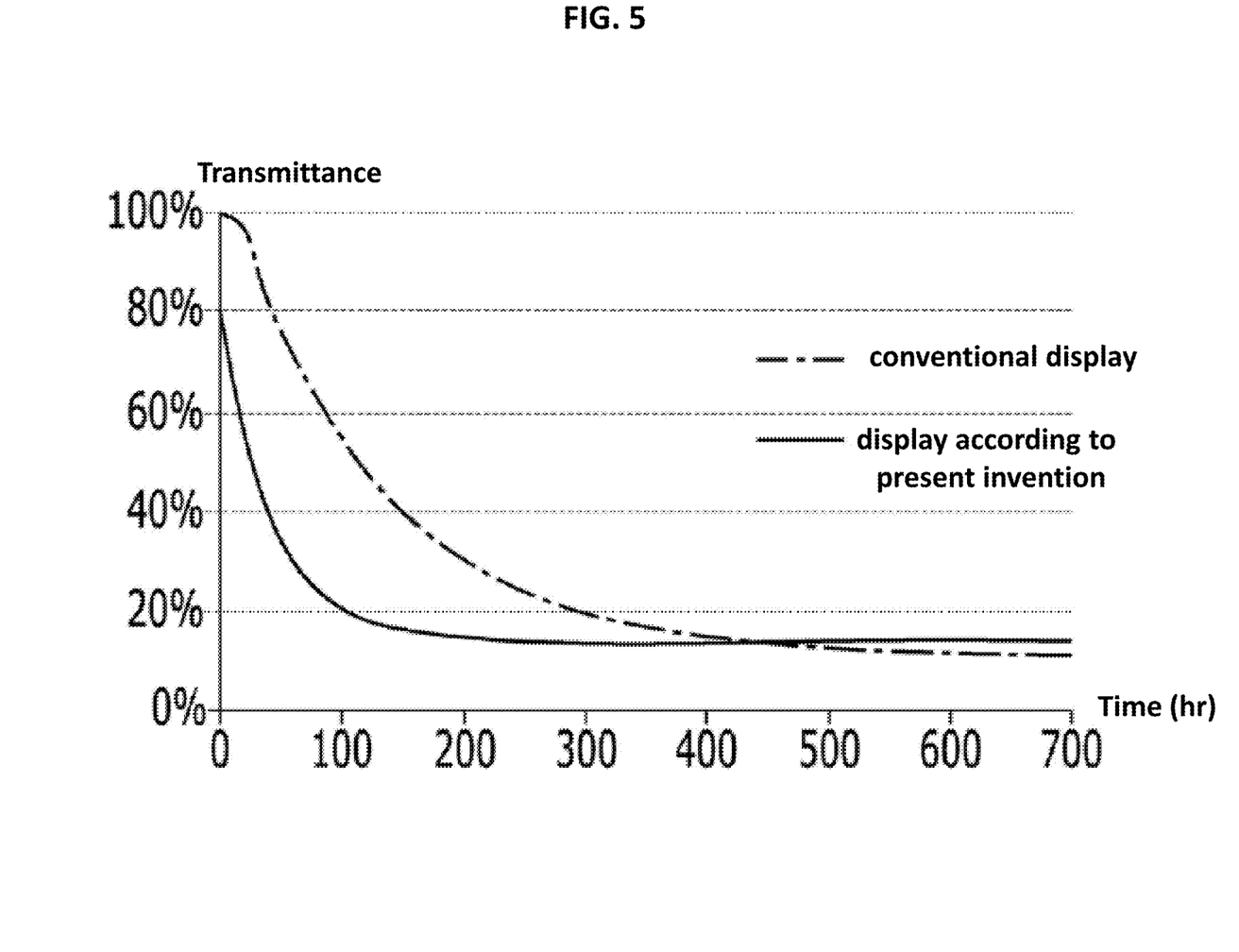
FIG. 5 is a graph comparatively showing relationships between time and transmittance in the liquid crystal display apparatus according to an example of the present invention, in which the low-resistance liquid crystal layer is applied only to the red (R) and green (G) pixel areas, and the conventional liquid crystal display apparatus.

Further, FIG. 5 is a graph comparatively showing relationships between time and transmittance in the liquid crystal display apparatus according to the present invention, in which the low-resistance liquid crystal layer is applied only to the red (R) and green (G) pixel areas, and the conventional liquid crystal display apparatus.

Referring to FIG. 5, as the results of discharging characteristic evaluation, it can be confirmed that stabilization was rapidly realized within 100 hours in the liquid crystal display apparatus according to the present invention in which the low-resistance alignment film is applied only to the red (R) and green (G) pixel areas, and thus the occurrence time of data coupling (DC) was delayed, compared to the conventional liquid crystal display apparatus.

Therefore, the liquid crystal display apparatus according to one or more embodiments of the present invention can realize stabilization more rapidly by forming a low-resistance alignment film or a low-resistance liquid crystal layer only in the red (R) and green (G) pixel areas and forming a general alignment film and a general liquid crystal layer in the blue (B) pixel area, thus preventing bright pixel defects caused by occurrence of data coupling (DC).

Figure 6:
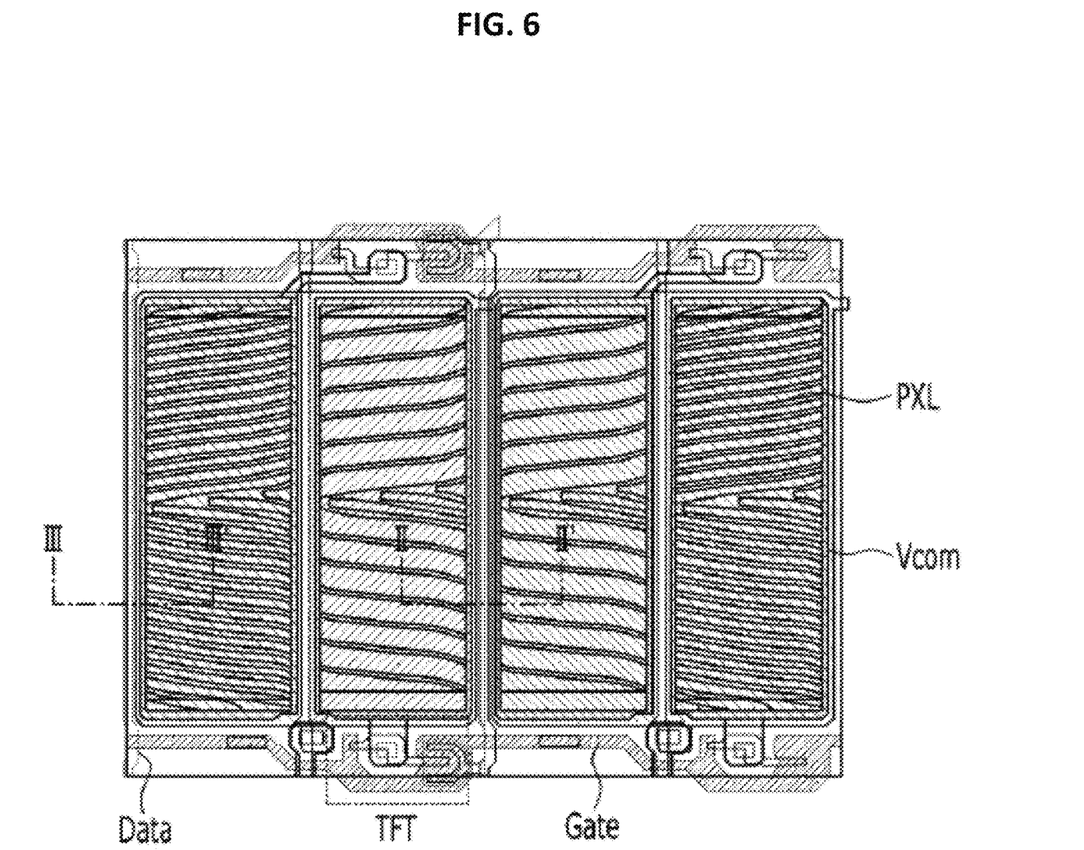
FIG. 6 and FIG. 7 are plan views illustrating liquid crystal display apparatuses having a flip structure according to other embodiments of the present invention, in which blue (B) pixel areas and red (R) and green (G) pixel areas are differently designed.
Figure 7:
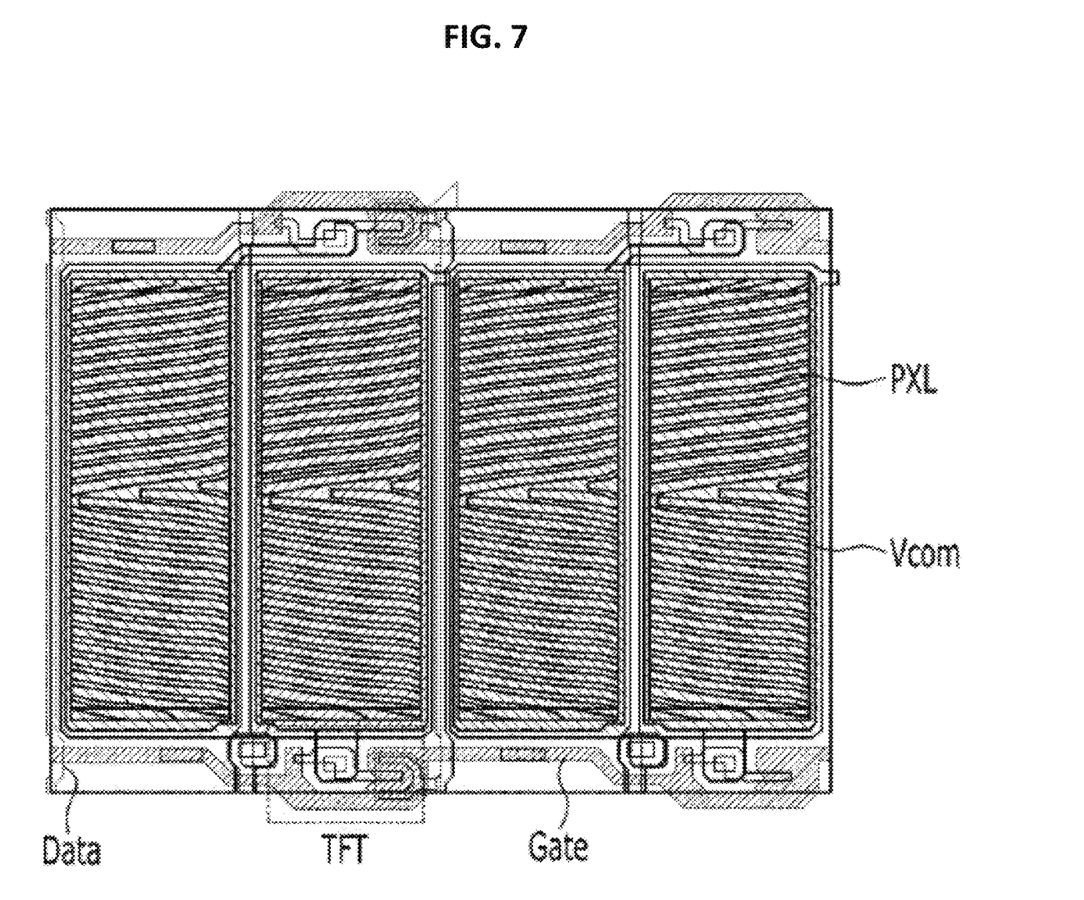

FIGS. 6 and 7 are plan views illustrating liquid crystal display apparatuses having a flip structure according to other embodiments of the present invention, in which blue (B) pixel area and red (R) and green (G) pixel area are designed differently.

For example, FIG. 6 is a plan view illustrating a liquid crystal display apparatus according to another embodiment of the present invention, which is designed such that the width of pixel electrodes formed in the red (R) and green (G) pixel areas is greater than the width of pixel electrodes formed in the blue (B) pixel area, and FIG. 7 is a plan view illustrating a liquid crystal display apparatus according to a further embodiment of the present invention, which is designed such that the bending angle of pixel electrodes formed in the red (R) and green (G) pixel areas is greater than the bending angle of pixel electrode formed in the blue (B) pixel area.

Some parts of the liquid crystal display apparatuses according to these embodiments shown in FIGS. 6 and 7, which are substantially the same as those of the liquid crystal display apparatuses shown in FIGS. 1 and 2, are denoted by the same reference numerals even though they are depicted in different drawings, and a detailed description thereof will thus be omitted or will be brief since it may be considered to be unnecessary.

Each of the liquid crystal display apparatuses according to these embodiments of the present invention includes, as shown in FIGS. 6 and 7, a plurality of gate lines arranged in one direction on one surface of an upper substrate 200, a plurality of data lines arranged to intersect the gate lines so as to define red (R), green (G) and blue (B) pixel areas, common lines Vcom formed alternately with the data lines, thin film transistors TFT formed at intersections between the gate lines and the data lines, pixel electrodes PXL connected to the thin film transistors TFT and common electrodes connected to the common lines Vcom to form a fringe field with the pixel electrodes PXL, a second alignment film 210 formed on the entire lower surface of the upper substrate 200, a lower substrate 100 arranged with a uniform gap between the lower substrate 100 and the upper substrate 200, red, green and blue color filter layers 120 formed on the lower substrate 100 so as to correspond to the red (R), green (G) and blue (B) pixel areas, a first alignment film 140 formed on the lower substrate 100 opposite the second alignment film 210, and a liquid crystal layer 300 formed between the upper substrate 200 and the lower substrate 100, and the first and second alignment films 140 and 210 formed in the red (R) and green (G) pixel areas are low-resistance alignment films and the liquid crystal layer 300 in the red (R) and green (G) pixel areas is a low-resistance liquid crystal layer.

Here, among the pixel electrodes PXL formed in the red (R), green (G) and blue (B) pixel areas, the outermost pixel electrode PXL among pixel electrodes has a greatest thickness, and thereby, data coupling (DC) can be improved.

Further, each bending angle of the pixel electrodes PXL formed in the red (R) and green (G) pixel areas is 7-8° (degrees) and the bending angle of the pixel electrode PXL formed in the blue (B) pixel area is maintained at 5° (degrees), and thus discharging characteristics can be improved due to the difference in composite angles, thereby being capable of preventing bright pixel defects caused by occurrence of data coupling (DC).

Alternatively, the width of the pixel electrodes PXL formed in the red (R) and green (G) pixel areas is 10 μm and the width of the pixel electrode PXL formed in the blue (B) pixel area is 5 μm, and thus discharging characteristics can be improved due to these different widths of the pixel electrodes PXL, thereby being capable of preventing of bright pixel defects caused by occurrence of data coupling (DC).

The pixel electrodes PXL can be formed of one selected from group of transparent materials consisting of indium tin oxide (ITO) and indium zinc oxide (IZO).

Figure 8:
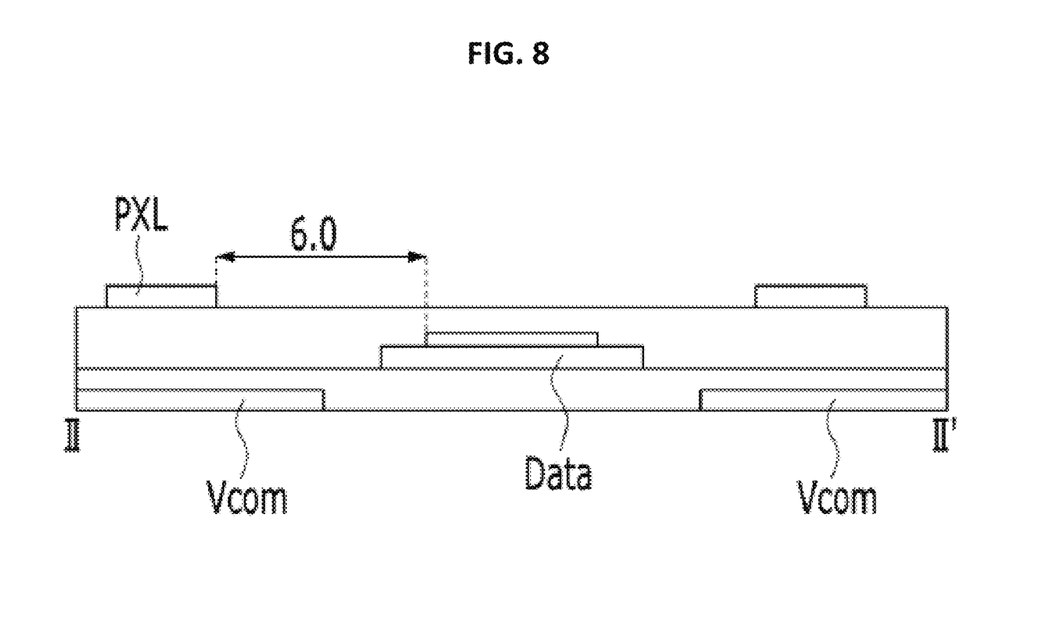
FIG. 8 and FIG. 9 are cross-sectional views taken along lines II-II' and III-III' of FIG. 6, illustrating different distances between a pixel electrode and a data line in the red (R) and green (G) pixel areas and in the blue (B) pixel areas in FIGS. 6 and 7.
Figure 9:
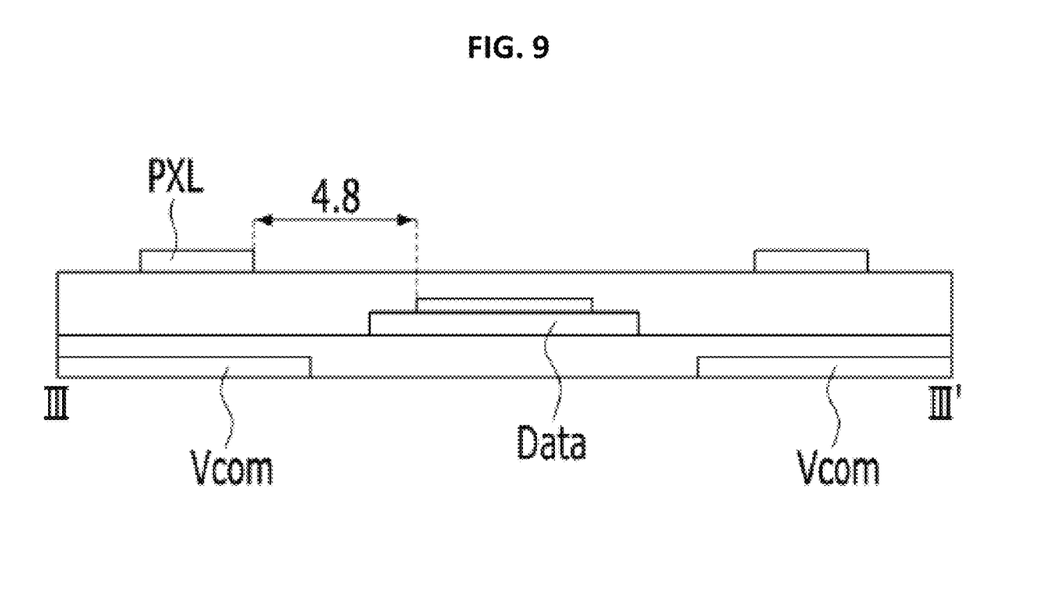

FIGS. 8 and 9 are cross-sectional views taken along lines II-II' and III-III' of FIG. 6, illustrating different distances between the pixel electrode and the data line in the red (R) and green (G) pixel areas and in the blue (B) pixel area in FIGS. 6 and 7.

As shown in FIGS. 8 and 9, the distance between the data line Data and the pixel electrode PXL in the red (R) and green (G) pixel areas is 6 μm, and the distance between the data line Data and the pixel electrode PXL in the blue (B) pixel area is 4.8 μm.

As the distance between the data line Data and the pixel electrode PXL increases, data coupling (DC) can be improved. This will be shown in FIG. 10.

Figure 10:
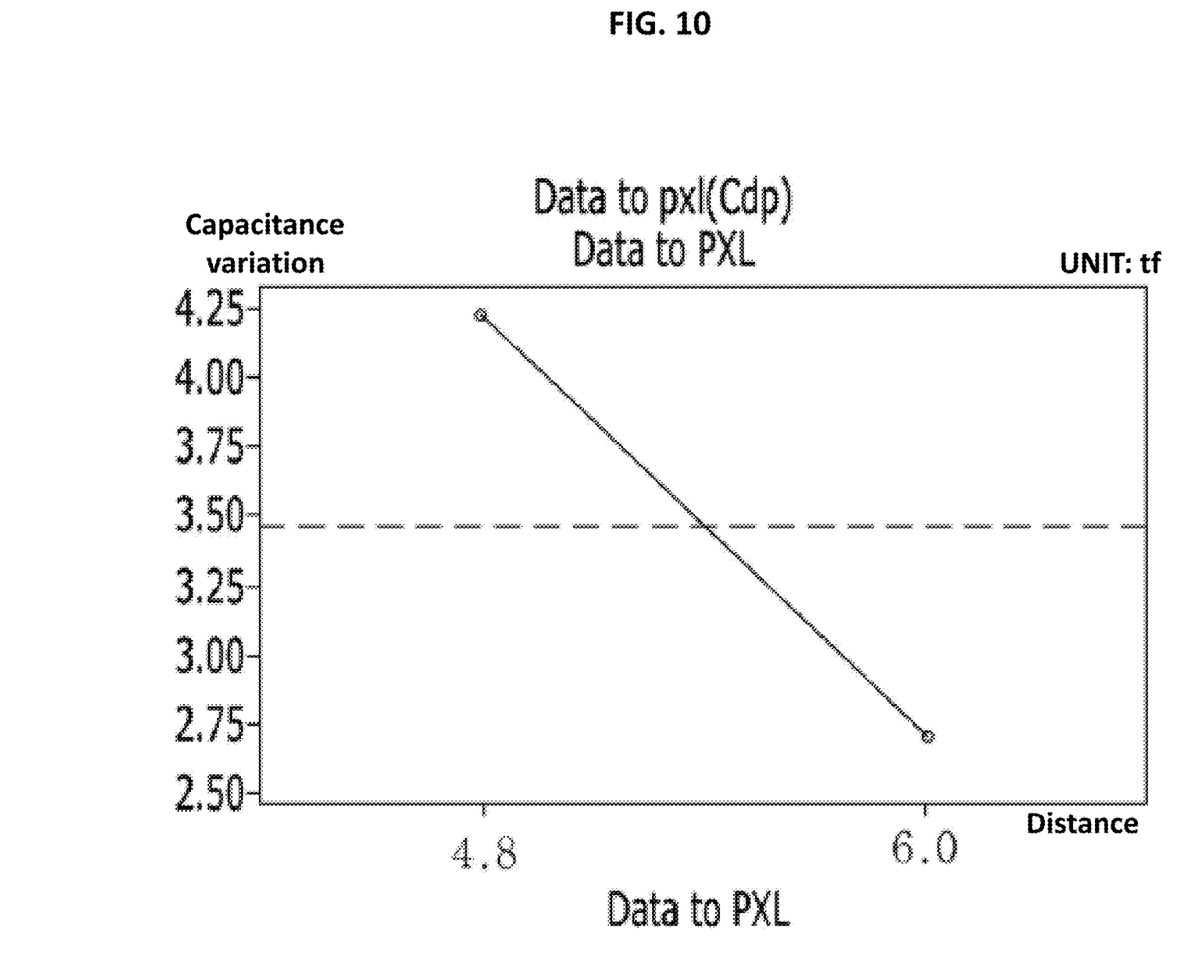
FIG. 10 is a graph illustrating a capacitance variation depending on the distance between the data line and the pixel electrode in the liquid crystal display apparatus according to an example of the present invention.

For example, FIG. 10 is a graph illustrating a capacitance variation depending on the distance between the data line and the pixel electrode in the liquid crystal display apparatus according to an example of the present invention.

As shown in FIG. 10, when the distance between the data line Data and the pixel electrode PXL in the red (R) and green (G) pixel areas is 6 μm and the distance between the data line Data and the pixel electrode PXL in the blue (B) pixel area is 4.8 μm, the red (R) and green (G) pixel areas exhibit a capacitance variation of 2.75 on average and the blue (B) pixel areas exhibit a capacitance variation of 4.25, and thus, it can be confirmed that, as the capacitance variation decreases and the distance between the data line Data and the pixel electrode PXL increases, data coupling (DC) can be improved.

Figure 11:
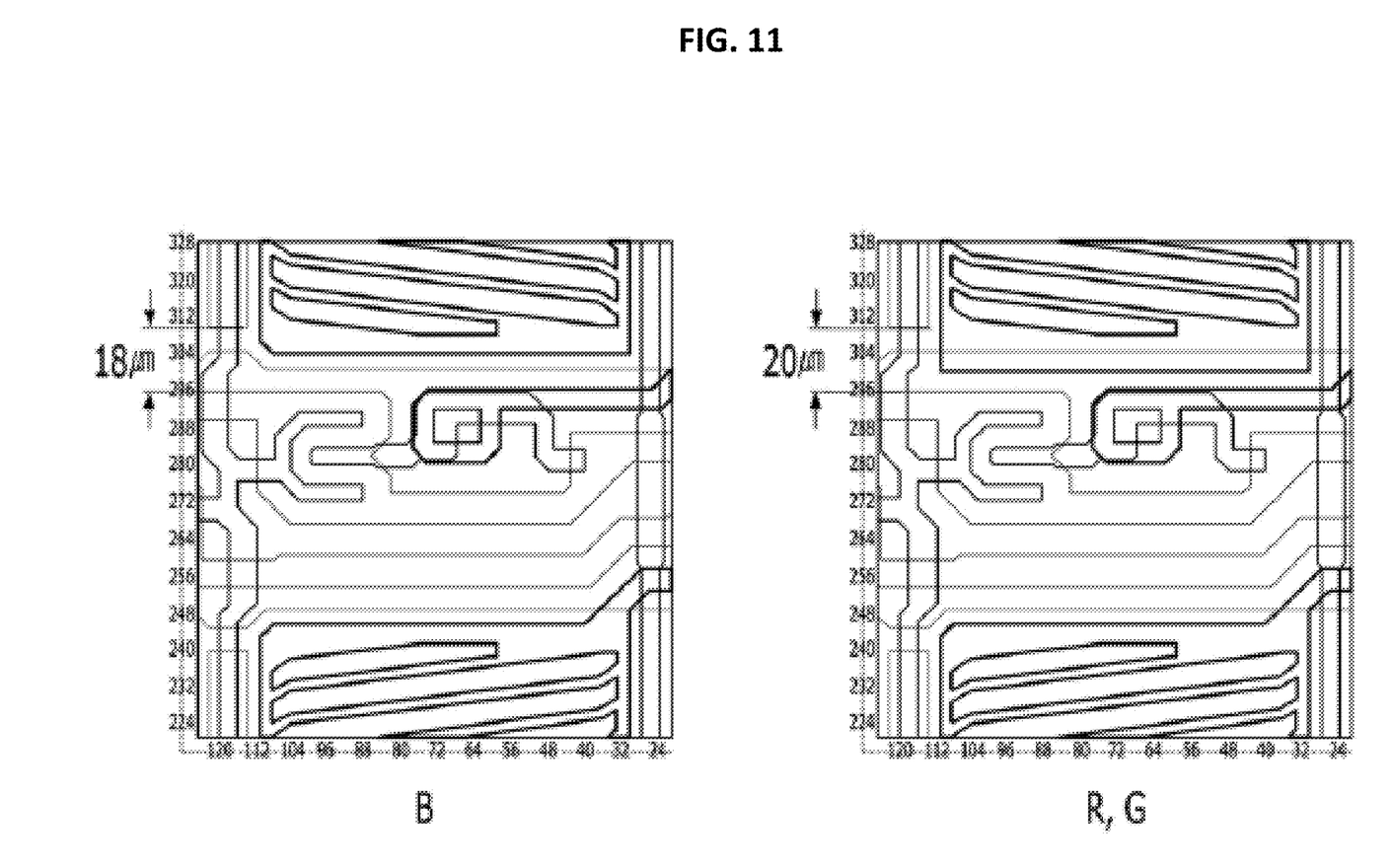
FIG. 11 is a view illustrating the distance between the pixel electrode and a channel region in each of the red (R) and green (G) pixel areas and in the blue (B) pixel area in FIGS. 6 and 7.

FIG. 11 is a view illustrating the distance between the pixel electrode and a channel region in each of the red (R) and green (G) pixel areas and in the blue (B) pixel area in FIGS. 6 and 7.

As shown in FIG. 11, the distance between the pixel electrode PXL and the channel region of the thin film transistor TFT in the red (R) and green (G) pixel areas is about 20 μm, and the distance between the pixel electrode PXL and the channel region of the thin film transistor TFT in the blue (B) pixel area is about 18 μm.

As described above, as the distance between the channel region of the thin film transistor TFT and the pixel electrode PXL increases, data coupling (DC) is improved and thus occurrence of data coupling (DC) defects can be prevented.

Figure 12:
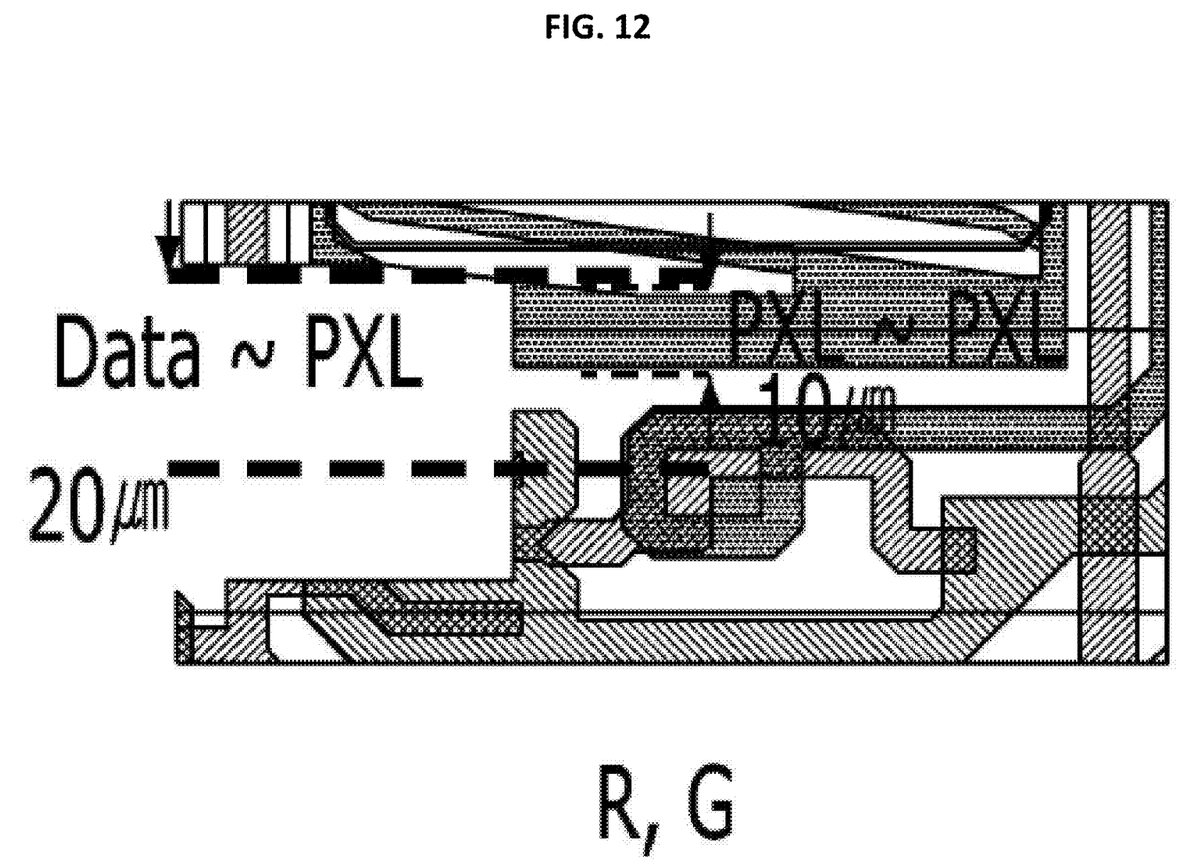
FIG. 12 and FIG. 13 are views illustrating the distance between the data line and the pixel electrode and the width of the pixel electrode in the red (R) and green (G) pixel areas and in the blue (B) pixel areas in FIGS. 6 and 7.
Figure 13:
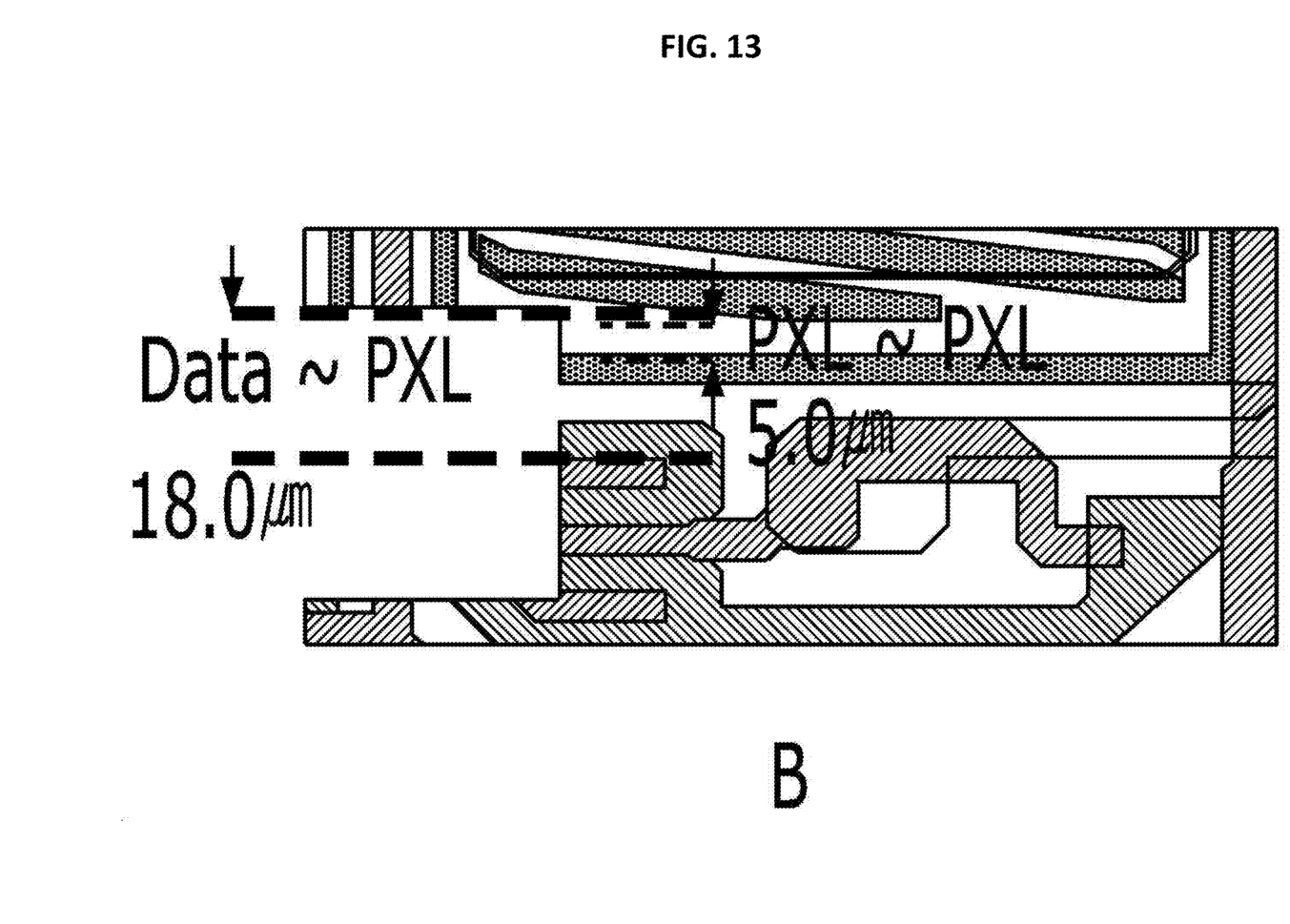

FIGS. 12 and 13 are views illustrating the distance between the data line and the pixel electrode and the width of the pixel electrode in the red (R) and green (G) pixel areas and in the blue (B) pixel area in FIGS. 6 and 7.

For example, as shown in FIG. 12, in the blue (B) pixel areas, the distance between the data line and the pixel electrode is 18.0 μm and the width of the pixel electrode is 5.0 μm, and, as shown in FIG. 13, in the red (R) and green (G) pixel areas, the distance between the data line and the pixel electrode is 20.0 μm and the width of the pixel electrode is 10.0 μm.

As described above with reference to FIG. 10, the capacitance variation can be reduced and thus stabilization speed can be increased by increasing the distance between the data line and the pixel electrode and the width of the pixel electrode, and thereby, data coupling (DC) defects occurring in the alignment films, caused by occurrence of data coupling (DC), can be prevented.

Figure 14:
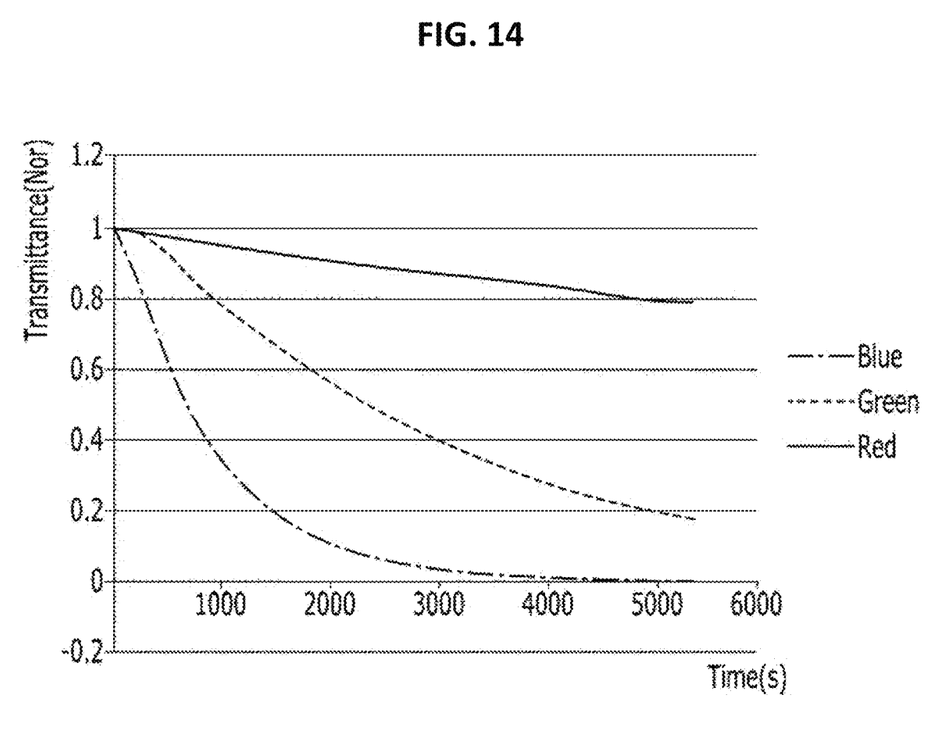
FIG. 14 is a graph illustrating stabilization curves of the red (R), green (G) and blue (B) pixels when light is radiated to the rear surface of a lower substrate of the liquid crystal display apparatus according to an embodiment of the present invention.

FIG. 14 is a graph illustrating stabilization curves of the red (R), green (G) and blue (B) pixels when light is radiated to the rear surface of the lower substrate of the liquid crystal display apparatus according to an example of the present invention.

In general, short-wavelength light is incident upon the red (R) and green (G) pixel areas and thus the resistance of an alignment film is high and thus causes bright pixel defects, but, as shown in FIG. 14, when a low-resistance alignment film is formed in the red (R) and green (G) pixel areas, the wavelengths of light incident upon the respective pixels are different and thus the resistances of the alignment film in the respective pixels are different.

Therefore, when the liquid crystal display apparatus according to one or more embodiments of the present invention is driven in a flip manner, the stabilization speed in the blue (B) pixels>the stabilization speed in the green (G) pixels>the stabilization speed in the red (R) pixels, but when the liquid crystal display apparatus is driven normally, the stabilization speeds of the alignment film in the red (R) pixels, the green (G) pixels and the blue (B) pixels are equal.

The embodiments of the present invention are applicable to a method for manufacturing a liquid crystal display apparatus in which color filters are formed on a first substrate. For example, the color filters are not formed on a second substrate provided with a black matrix formed thereon but can be formed on the first substrate.

As is apparent from the above description, a liquid crystal display apparatus in accordance with one or more embodiments of the present invention has the following effects and advantages.

First, a low-resistance alignment film or a low-resistance liquid crystal layer is selectively formed only in red (R) and green (G) pixel areas and a general alignment film and a general liquid crystal layer are formed in blue (B) pixel area, thus being capable of preventing bright pixel defects caused by occurrence of data coupling (DC).

Second, among pixel electrodes PXL formed in the red (R), green (G) and blue (B) pixel areas, the outermost pixel electrode PXL has a greater thickness than other pixel electrodes PXL, thus being capable of improving data coupling (DC).

Third, each bending angle of the pixel electrodes PXL formed in the red (R) and green (G) pixel areas is designed to be greater than the bending angle of the pixel electrode PXL formed in the blue (B) pixel area and thus causes different composite angles, thereby being capable of improving discharging characteristics and preventing bright pixel defects caused by occurrence of data coupling (DC).

Fourth, the width of the pixel electrodes PXL formed in the red (R) and green (G) pixel areas is designed to be greater than the width of the pixel electrode PXL formed in the blue (B) pixel area, thereby being capable of improving discharging characteristics and thus preventing bright pixel defects caused by occurrence of data coupling (DC).

Fifth, as the distance between the channel region of a thin film transistor TFT and the pixel electrode PXL increases and as the width of the pixel electrode PXL increases, data coupling (DC) can be improved and thus occurrence of data coupling (DC) defects can be prevented.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display apparatus comprising:
   a plurality of gate lines arranged in one direction on an upper surface of a first substrate;
   a plurality of data lines arranged to intersect the gate lines so as to define red (R), green (G) and blue (B) pixel areas;
   a plurality of common lines provided alternately with the data lines;
   a plurality of thin film transistors provided at intersections between the gate lines and the data lines;
   a plurality of pixel electrodes connected to the thin film transistors and a plurality of common electrodes connected to the common lines to form a fringe field with the pixel electrodes;
   a first alignment film provided on an entire lower surface of the first substrate;
   a second substrate arranged at a uniform distance from the first substrate;
   a plurality of red, green and blue color filter layers provided on the second substrate so as to correspond to the red (R), green (G) and blue (B) pixel areas, respectively;
   a second alignment film provided on the second substrate opposite to the first alignment film; and
   a liquid crystal layer provided between the first substrate and the second substrate,
   wherein the first alignment film provided on the red and green color filter layers and not on the blue filter layer is a low-resistance alignment film.

2. The liquid crystal display apparatus according to claim 1, wherein each distance between the pixel electrodes and the data lines provided in the red (R) and green (G) pixel areas is greater than a distance between the pixel electrode and the data line provided in the blue (B) pixel area.

3. The liquid crystal display apparatus according to claim 1, wherein each distance between the pixel electrodes and each channel of the thin film transistors provided in the red (R) and green (G) pixel areas is greater than a distance between the pixel electrode and a channel of the thin film transistor provided in the blue (B) pixel area.

4. The liquid crystal display apparatus according to claim 1, wherein an outermost pixel electrode among the pixel electrodes has a greatest thickness among the pixel electrodes.

5. The liquid crystal display apparatus according to claim 1, further comprising a column spacer configured to maintain the uniform distance between the first substrate and the second substrate,
   wherein the column spacer is a black column spacer.

6. The liquid crystal display apparatus according to claim 1, wherein the first substrate is an upper substrate and the second substrate is a lower substrate.

7. The liquid crystal display apparatus according to claim 1, wherein a bending angle of the pixel electrodes provided in the red (R) and green (G) pixel areas is greater than a bending angle of the pixel electrode provided in the blue (B) pixel area.

8. The liquid crystal display apparatus according to claim 1, wherein each width of the pixel electrodes provided in the red (R) and green (G) pixel areas is greater than a width of the pixel electrode provided in the blue (B) pixel area.

9. The liquid crystal display apparatus according to claim 7, wherein the bending angle of the pixel electrodes provided in the red (R) and green (G) pixel areas is approximately 7-8° (degrees), and the bending angle of the pixel electrode provided in the blue (B) pixel area is approximately 5° (degrees).

10. The liquid crystal display apparatus according to claim 1, wherein the liquid crystal layer provided on the red and green color filter layers is a low-resistance liquid crystal layer.

11. A liquid crystal display apparatus comprising:
    a plurality of gate lines arranged in one direction on an upper surface of a first substrate;
    a plurality of data lines arranged to intersect the gate lines so as to define red (R), green (G) and blue (B) pixel areas;
    a plurality of common lines provided alternately with the data lines;
    a plurality of thin film transistors provided at intersections between the gate lines and the data lines;
    a plurality of pixel electrodes connected to the thin film transistors and a plurality of common electrodes connected to the common lines to form a fringe field with the pixel electrodes;
    a first alignment film provided on an entire lower surface of the first substrate;
    a second substrate arranged at a uniform distance from the first substrate;
    a plurality of red, green and blue color filter layers provided on the second substrate so as to correspond to the red (R), green (G) and blue (B) pixel areas, respectively;

a second alignment film provided on the second substrate opposite to the first alignment film; and a liquid crystal layer provided between the first substrate and the second substrate, wherein the first alignment film provided on the red and green color filter layers is a low-resistance alignment film, and wherein each distance between the pixel electrodes and the data lines provided in the red (R) and green (G) pixel areas is greater than a distance between the pixel electrode and the data line provided in the blue (B) pixel area.

12. A liquid crystal display apparatus comprising:

a plurality of gate lines arranged in one direction on an upper surface of a first substrate;

a plurality of data lines arranged to intersect the gate lines so as to define red (R), green (G) and blue (B) pixel areas;

a plurality of common lines provided alternately with the data lines;

a plurality of thin film transistors provided at intersections between the gate lines and the data lines;

a plurality of pixel electrodes connected to the thin film transistors and a plurality of common electrodes connected to the common lines to form a fringe field with the pixel electrodes;

a first alignment film provided on an entire lower surface of the first substrate;

a second substrate arranged at a uniform distance from the first substrate;

a plurality of red; green and blue color filter layers provided on the second substrate so as to correspond to the red (R), green (G) and blue (B) pixel areas, respectively;

a second alignment film provided on the second substrate opposite to the first alignment film; and a liquid crystal layer provided between the first substrate and the second substrate, wherein the first alignment film provided on the red and green color filter layers is a low-resistance alignment film, and wherein each width of the pixel electrodes provided in the red (R) and green (G) pixel areas is greater than a width of the pixel electrode provided in the blue (B) pixel area.

* * * * *